July 16, 1963 W. F. SINDELAR 3,097,859
DETENT COUPLING MEANS FOR SOCKET OF ROTARY POWER TOOL
Filed Nov. 13, 1961
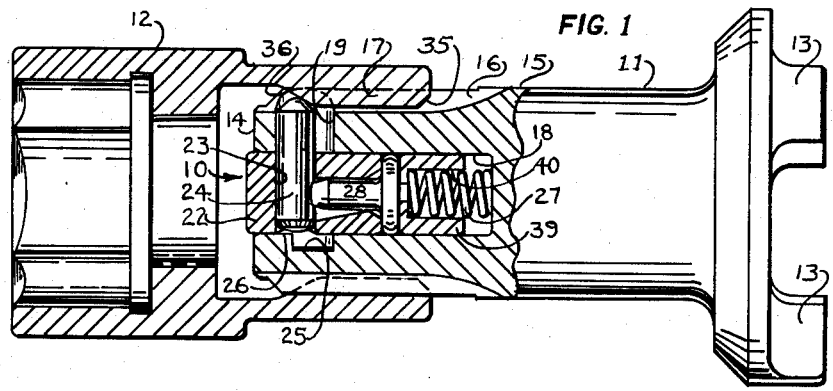
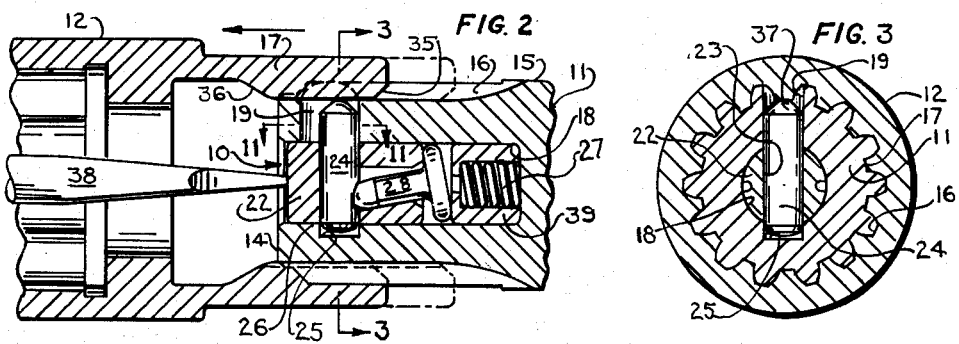
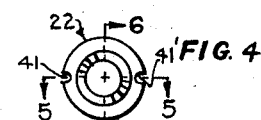
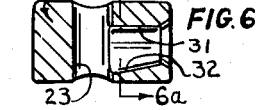
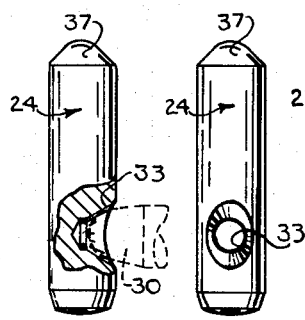
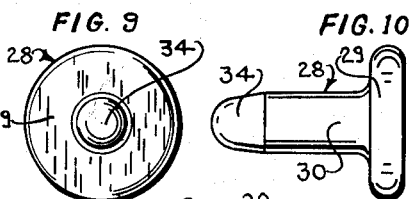
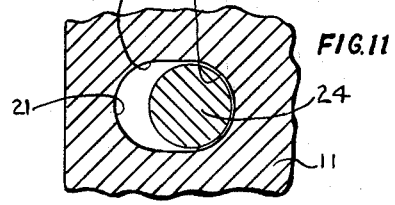
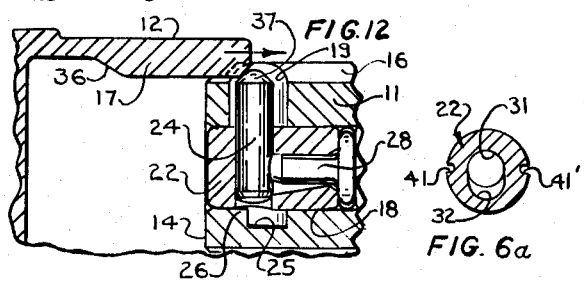
WILLIAM F. SINDELAR
INVENTOR.
BY

United States Patent Office 3,097,859
Patented July 16, 1963

3,097,859
DETENT COUPLING MEANS FOR SOCKET OF ROTARY POWER TOOL
William F. Sindelar, Seven Hills, Ohio, assignor to Master Power Corporation, Solon, Ohio, a corporation of Ohio
Filed Nov. 13, 1961, Ser. No. 151,880
16 Claims. (Cl. 279—97)

The present invention relates to detent coupling means for the socket of a rotary tool, and more particularly, to a socket retainer for a rotary power tool, such as an impact wrench.

It is an object of the present invention to provide detent coupling means for the socket of a rotary tool, whereby the socket will be precluded from being inadvertently removed from the shank of the tool.

It is another object of the present invention to provide a socket retainer for a rotary power tool, wherein a simple and easy manual manipulation is all that is required to remove the socket from the shank of the tool.

It is yet still another object of the present invention to provide a socket retainer for a rotary power tool, wherein the socket may be easily placed upon the shank of the tool without requiring any previous adjustment or manipulation of the detent coupling means.

These and other objects of the present invention will become apparent from a reading of the following specification, taken in conjunction with the enclosed drawings, in which:

FIGURE 1 is a complete view of the socket positioned upon the shank of a rotary tool and retained thereon by the detent coupling means of the present invention;

FIGURE 2 is a view corresponding to a portion of FIGURE 1, but showing the detent coupling means suitably manipulated to remove the socket from the shank of the tool;

FIGURE 3 is a view taken along the lines 3—3 of FIGURE 2, showing the means for forming a rotative engagement between the socket and the shank, and further showing the detent pin in its retracted position so as to enable the socket to be slidably removed from the shank;

FIGURE 4 is an end elevational view of the detent release pin included in the detent coupling means;

FIGURE 5 is a view taken along the lines 5—5 of FIGURE 4;

FIGURE 6 is a view taken along the lines 6—6 of FIGURE 4;

FIGURE 6a is a view taken along the lines 6a—6a of FIGURE 6;

FIGURE 7 is an enlarged side elevational view of the detent pin, with parts broken away and sectioned to show the blind tapered pocket formed within the detent pin, and with a portion of the detent pin actuator being shown in broken lines;

FIGURE 8 is a front elevational view of the detent pin shown in FIGURE 7;

FIGURE 9 is an enlarged end elevational view of the detent pin actuator;

FIGURE 10 is a side elevational view of the detent pin actuator shown in FIGURE 9;

FIGURE 11 is an enlarged view taken along the lines 11—11 of FIGURE 2, showing the detent pin in relationship to the transverse slot formed in the shank; and FIGURE 12 is a view corresponding to a portion of FIGURE 2, but showing the socket being initially received upon the shank of the tool.

With reference to the drawings, and in particular to FIGURES 1, 2, and 3 thereof, there is illustrated detent coupling means 10 between the shank 11 and the socket 12 of a rotary power tool. In one particular embodiment of the present invention, the shank 11 is formed integrally with the anvil of a pneumatic impact wrench, such that the shank 11 will have suitable anvil lugs or impact teeth 13 formed thereon. The shank 11 has a forward face 14 and further has an external surface 15. The socket 12 is slidably received upon the shank 11, and means are provided to form a rotative engagement between the shank 11 and the socket 12. Preferably, but not necessarily, such means may comprise a series of circumferentially-spaced longitudinal splines 16 formed on the external surface 15 of the shank 11, the splines being separated by longitudinal grooves, and the socket having corresponding internal longitudinal splines 17 (separated by longitudinal grooves) to rotatably engage the socket 12 with the shank 11.

The shank 11 has a blind axial bore 18 terminating at the forward face 14 of the shank 11, and the shank 11 further has a transverse slot 19. The transverse slot 19 leads from the blind axial bore 18 to the external surface 15 of the shank 11 and is axially spaced rearwardly from the forward face 14 of the shank 11. As shown more particularly in FIGURE 11, the transverse slot 19 includes a rearward portion 20 and further includes a forward wall 21, with the transverse slot having a substantially elliptical cross section taken axially of the shank 11.

A detent carrying member, such as detent release pin 22, is slidably received in the blind axial bore 18 of the shank 11 and is accessible internally of the socket 12. The normal position of the detent release pin is shown in FIGURE 1, while the depressed position of the detent release pin 22 is shown in FIGURE 2. The detent release pin 22 has a through transverse bore 23 (see FIGURE 6), and a detent pin 24 is slidably received in the through transverse bore 23 of the detent release pin 22. As shown in FIGURE 11, the detent pin 24 has a diameter which is less than the axial length of transverse slot 19.

The shank 11 is further provided with an internal pocket 25, which communicates with the blind axial bore 18 of the shank 11, and which is axially spaced rearwardly from the forward face 14 of the shank 11. As shown particularly in FIGURE 3, the internal pocket 25 is disposed circumferentially opposite from the rearward portion 20 of the transverse slot 19 formed in the shank 11. Moreover, as further shown in FIGURE 3, the detent pin 24 lies in a radial plane passing through a respective one of the longitudinal grooves formed between the splines 16 of the shank 11, such that the detent pin 24 will always be engaged by any one of the internal splines 17 of the socket 12, as the socket 12 is slidably received upon the shank 11. A ledge 26 is formed within the shank 11 coterminous with the blind axial bore 18 of the shank 11. The ledge 26 is adjacent to the internal pocket 25 and is disposed forwardly therefrom. Also, yieldable means, such as compression spring 27, is provided in the blind axial bore 18 of the shank 11 so as to constantly urge the detent release pin 22 out of the blind axial bore 18 of the shank 11.

Consequently, in the normal position of the detent release pin 22, the detent pin 24 assumes its normal position, such that (as shown in FIGURE 1) detent pin 24 rests upon the ledge 26, passes through the detent release pin 22 to be disposed against the forward wall 21 of the transverse slot 19 formed in the shank 11, and protrudes beyond the external surface 15 of the shank 11.

Moreover, in the depressed position of the detent release pin 22 in the blind axial bore 18 of the shank 11, as shown in FIGURE 2, the detent pin 24 is in its retracted position, that is to say, retracted in the through transverse bore 23 of the detent release pin 22 to be received within the internal pocket 25. In such a manner, the detent pin 22 is disposed below the external surface 15 of the shank 11 (that is, below the respective one of the longitudinal grooves between the splines 16) so as to allow the socket 12 to be slidably removed from the shank 11.

Means are provided in the blind axial bore 18 of the shank 11 to automatically return the detent pin 24 from its retracted position to its normal position upon the removal of the socket 12 from the shank 11. Such means, acting under the influence of spring 27, comprises a detent pin actuator 28 which is disposed in the blind axial bore 18 of the shank 11 intermediate of the detent release pin 22 and the spring 27. The detent pin actuator 28, as shown more particularly in FIGURES 9 and 10, comprises a cap 29 and an integral stem 30 emanating forwardly of the cap 29.

With reference to FIGURES 5, 6, and 6a, the detent release pin 22 has a rearward axial bore 31 terminating at the through transverse bore 23, and the detent release pin 22 further has a rearward angled bore 32 merging in communication with the rearward axial bore 31. The rearward angled bore 32 is angled away from the transverse slot 19 of the shank 11 as shown in FIGURE 1. The stem 30 of the detent pin actuator 28 is normally received in the rearward axial bore 31 in the normal position of the detent release pin 22 as shown in FIGURE 1. In the depressed position of the detent release pin 22, however, the detent pin actuator 28 will be tilted or pivoted so as to be received within the rearward angled bore 32 of the detent release pin 22, that is to say, the detent release pin 22 has a limited pivoted movement with respect to the detent release pin 22.

Moreover, as shown more clearly in FIGURES 7, 8, and 10, the detent pin 24 has a blind tapered pocket 33 whose walls diverge outwardly of the detent pin 24; and the stem 30 of the detent pin actuator 28 has a rounded tip 34 which is loosely received within the blind tapered pocket 33 of the detent pin 24.

Consequently, it will be appreciated that the limited pivoted movement of the detent pin actuator 28, in effect, "cocks" the detent pin 24 and moves it from its retracted position within the detent release pin 22 into its normal position as shown in FIGURE 1.

With reference, again, to FIGURES 1 and 2, the socket 12 has a first abutting surface comprising a forward annular inclined shoulder 35 formed forwardly of the internal longitudinal splines 17 of the socket 12; and moreover, the socket 12 has a second abutting surface comprising an internal annular inclined shoulder 36 formed rearwardly of the internal splines 17 of the socket 12. As shown in FIGURES 7 and 8, the detent pin 24 has a semi-spherical tip 37 which protrudes beyond the external surface 15 of the shank 11 to respectively engage either of the shoulders 35, 36 of the socket 12.

The operation of the invention is as follows: To remove the socket 12 from the shank 11, as shown in FIGURE 2, a suitable tool, such as the blade 38 of a screw driver (or else the operator's finger), is inserted within the open socket 12 so as to engage the detent release pin 22 and to depress the detent release pin 22 within the blind axial bore 18 of the shank 11 against the tension of the spring 27. Hence, the tip 37 of the detent pin 24 will exhibit a camming effect against the rear or internal annular inclined shoulder 36 of the socket 12. Consequently, the detent pin 24 will be moved rearwardly in the transverse slot 19 of the shank 11, and simultaneously, the detent pin 24 will be retracted transversely within the through transverse bore 23 of the detent release pin 22, with the result that the detent pin 24 will be removed from the ledge 26 and will be received partially within the internal pocket 25 of the shank 11, as shown in FIGURES 2 and 3. Hence, the detent pin 24 will no longer protrude beyond the external surface 15 of the shank 11, that is to say, the detent pin 24 will be below the respective longitudinal groove of the shank 11, thus allowing the socket 12 to be slidably removed from the shank 11, as shown in FIGURE 2. At the same time, the detent pin actuator 28 has a limited pivoted movement with respect to the detent release pin 22 (as the detent pin actuator 28 and the detent release pin 22 are being depressed within the blind axial bore 18 of the shank 11) such that the stem 30 of the detent pin actuator 28 is received within the rearward angled bore 32 of the detent release pin 22. Then, when the socket 12 is removed completely from the shank 11, the detent pin actuator 28, under the influence of compression spring 27, will assume its normal position, such that the detent pin actuator 28 will lift the detent pin 24 out of the internal pocket 25 of the shank 11, thus allowing the detent pin 24 to assume its normal position, that is to say, resting upon the ledge 26.

An important advantage of the present invention resides in the ability to place the socket 12 upon the shank 11 without previously requiring the detent release pin 22 to be depressed or manipulated in the manner set forth above. As clearly shown in FIGURE 12, when the socket 12 is initially engaged upon the shank 11, the forward annular inclined shoulder 35 of the socket 12 will engage the rounded tip 37 of the detent pin 24, thus moving the detent pin 24 away from the forward wall 21 of the transverse slot 19 formed in the shank 11; and in such a manner, the detent release pin 22 is itself automatically depressed within the blind axial bore 18 of the shank 11. Simultaneously, the detent pin 24 will be retracted transversely in the through transverse bore 23 of the detent release pin 22, in the manner set forth above, such that the detent pin 24 will again be received in the internal pocket 25 to allow the socket 12 to be slidably received upon the shank 11 without requiring a deliberate depression of the detent release pin 22.

Also, as shown in FIGURES 1 and 2, a spring cap 39 is received preferably within the blind axial bore 18 of the shank 11 intermediate the spring 27 and the detent pin actuator 28. The spring cap 39 has an axial bore 40 for receiving and guiding the spring 27.

Moreover, as shown in FIGURES 4 and 5, the detent release pin 22 has a pair of longitudinal surface grooves 41 and 41' circumferentially opposite one another. In the assembly of the detent coupling means 10 within the shank 11, a suitable tool (or a pair of wires) may be received in the grooves 41 and 41' to depress the detent pin actuator 28 in the blind axial bore 18 of the shank 11 and to prevent any limited pivoted movement of the detent pin actuator 28, thereby allowing the detent pin 24 to be assembled in the detent release pin 22 via the transverse slot 19 of the shank 11.

Obviously, many modifications may be made without departing from the basic spirit of the present invention; and accordingly, within the scope of the appended claims, the invention may be practiced other than has been specifically described.

I claim:

1. Detent coupling means for the socket of a rotary tool, comprising:
   (a) a shank;
   (b) said shank having a forward face and further having an external surface;
   (c) a socket slidably received upon said shank;
   (d) means forming a rotative engagement between said shank and said socket;
   (e) said shank having an axial opening terminating at said forward face of said shank;
   (f) said shank further having a transverse opening leading from said axial opening to said external surface of said shank, said transverse opening being axially spaced rearwardly from said forward face of said shank, and said transverse opening including a rearward portion and further including a forward wall;
   (g) a detent carrying member slidably received in said axial opening in said shank and accessible internally of said socket, said detent carrying member having a normal position and a depressed position in said axial opening of said shank;

(h) said detent carrying member having a through transverse opening;
(i) a detent slidably received in said through transverse opening of said detent carrying member;
(j) said shank further having an internal pocket communicating with said axial opening in said shank and axially spaced rearwardly from said forward face of said shank, said internal pocket being disposed circumferentially opposite from said rearward portion of said transverse opening in said shank;
(k) a ledge formed within said shank coterminous with said axial opening of said shank, said ledge being adjacent to said internal pocket and forwardly therefrom;
(l) yieldable means to urge said detent carrying member out of said axial opening in said shank, whereby in the normal position of said detent carrying member, said detent is in its normal position resting upon said ledge and passing through said detent carrying member to be disposed against said forward wall of said transverse opening in said shank and to protrude beyond said external surface of said shank, and whereby in the depressed position of said detent carrying member, said detent is in its retracted position, being received within said internal pocket and being retracted in said transverse opening of said detent carrying member to be disposed below said external surface of said shank;
(m) means in said axial opening of the shank to automatically return said detent from its retracted position to its normal position; and
(n) said socket having a first abutting surface and a second abutting surface, and said means forming a rotative engagement between said socket and said shanks being intermediate said first and second abutting surfaces, whereby as said socket is initially received upon said shank, said first abutting surface engages said detent and moves said detent carrying member its normal position to its depressed position, said detent thereby moving into its retracted position to allow said socket to be slidably received upon said shank, said second abutting surface of said socket thereafter engaging said detent to preclude an inadvertent removal of said socket from said shank when said socket is fully received upon said shank, and whereby, to remove said socket from said shank, said detent carrying member is depressed internally of said socket to move said detent into its retracted position.

2. Detent coupling means as described in claim 1, wherein said means forming a rotative engagement between said shank and said socket comprises:
(a) means forming a series of circumferentially-spaced longitudinal splines on said external surface of said shank, said splines being separated by longitudinal grooves; and
(b) said socket having corresponding internal longitudinal splines separated by longitudinal grooves, thereby to rotatively engage said socket with said shank.

3. Detent coupling means as described in claim 2, wherein said detent lies in a radial plane passing through one of said longitudinal grooves of said shank, whereby said detent is engaged by one of said splines of said socket as said socket is being received on said shank.

4. Detent coupling means as described in claim 1, wherein said axial opening in said shank comprises a blind axial bore.

5. Detent coupling means as described in claim 1, wherein said transverse opening in said shank comprises a slot having a substantially elliptical cross-section taken axially of said shank.

6. Detent coupling means as described in claim 4, wherein said detent carrying member comprises a detent release pin having a through transverse bore.

7. Detent coupling means as described in claim 6, wherein:
(a) said detent comprises a pin slidably received in said through transverse bore of said detent release pin;
(b) said pin having a semi-spherical tip protruding beyond said external surface of said shank to respectively engage said first and second abutting surfaces of said socket.

8. Detent coupling means as described in claim 6, wherein said yieldable means comprises a compression spring received in said blind axial bore of said shank rearwardly of said detent release pin and urging said detent release pin outwardly of said blind axial bore in said shank.

9. Detent coupling means as described in claim 2, wherein said first abutting surface of said socket comprises an annular inclined shoulder formed forwardly of said internal longitudinal splines of said socket, whereby as said socket is initially received upon said shank, said annular inclined shoulder engages said detent and exerts a camming effect upon said detent to thereby retract said detent transversely in said detent carrying member, and to thereby automatically depress said detent carrying member in said axial opening of said shank.

10. Detent coupling means as described in claim 2, wherein said second abutting surface of said socket comprises an internal annular inclined shoulder formed rearwardly of said internal longitudinal splines of said socket, whereby said detent normally engages said internal annular inclined shoulder to hold said socket to said shank, and whereby said detent carrying member may be depressed in said axial opening of said shank to clear said detent from said internal annular inclined shoulder and allow said socket to be slidably removed from said shank.

11. Detent coupling means for the socket of a rotary power tool, comprising:
(a) a shank;
(b) said shank having a forward face and further having an external surface;
(c) a socket slidably received upon said shank;
(d) means forming a rotative engagement between said shank and said socket;
(e) said shank having a blind axial bore terminating at said forward face of said shank;
(f) said shank further having a transverse slot leading from said bore to said external surface of said shank, said transverse slot being axially spaced rearwardly from said forward face of said shank, and said transverse slot including a rearward portion and further including a forward wall;
(g) a detent release pin slidably received in said blind axial bore of said shank and accessible internally of said socket, said detent release pin having a normal position and a depressed position in said blind axial bore of said shank;
(h) said detent release pin having a through transverse bore formed therein;
(i) a detent pin slidably received in said through transverse bore of said detent release pin, said detent pin having a diameter which is less than the axial length of said transverse slot in said shank;
(j) said shank further having an internal pocket communicating with said bore in said shank and axially spaced rearwardly from said forward face of said shank, said internal pocket being disposed circumferentially opposite from said rearward portion of said transverse opening in said shank;
(k) a ledge formed within said shank coterminous with said bore of said shank, said ledge being adjacent to said internal pocket and forwardly therefrom;
(l) yieldable means in said bore of said shank to urge said detent release pin outwardly of said bore, whereby in the normal position of said detent release pin, said detent pin is in its normal position resting upon said ledge and passing through said detent release pin to be disposed against said forward wall of said transverse slot in said shank and to protrude beyond said external surface of said shank, and whereby in the depressed position of said detent release pin, said detent pin is in its retracted position, being received within said internal pocket and being retracted in said through transverse bore of said detent release pin to be disposed below said external surface of said shank;

(m) means including a detent pin actuator to automatically return said detent pin from its retracted position to its normal position, said detent pin actuator being disposed in said bore of said shank intermediate said detent release pin and said yieldable means;

(n) means in said detent release pin to allow said detent pin actuator to be received therein to engage said detent pin;

(o) said detent pin actuator having both an axial sliding movement in said bore of said shank and a simultaneous limited pivoted movement with respect to said detent release pin, thereby to cock said detent pin and return said detent pin to its normal position under the influence of said yieldable means; and (p) said socket having a first abutting surface and a second abutting surface, said means forming a rotative engagement between said socket and said shank being intermediate said first and second abutting surfaces, whereby as said socket is initially received upon said shank, said first abutting surface engages said detent pin and moves said detent carrying member from its normal position to its depressed position in said blind axial bore of said shank, said detent pin thereby moving into its retracted position to allow said socket to be slidably received upon said shank, said second abutting surface of said socket thereafter engaging said detent to preclude an inadvertent removal of said socket from said shank when said socket is fully received upon said shank, and whereby, to remove said socket from said shank, said detent release pin is depressed internally of said socket to move said detent pin into its retracted position.

12. Detent coupling means as described in claim 11, wherein said detent pin actuator comprises:
(a) a cap adjacent to said detent release pin;
(b) an integral stem emanating forwardly of said cap;
(c) said stem being received in said detent release pin to protrude within said through transverse bore of said detent release pin; and
(d) said stem having a rounded tip engaging said detent pin.

13. Detent coupling means as described in claim 12, wherein:
(a) said detent pin is provided with a blind tapered pocket having walls diverging outwardly of said detent pin; and wherein
(b) said rounded tip of said stem of said detent pin actuator is loosely received within said blind tapered pocket of said detent pin.

14. Detent coupling means as described in claim 12, wherein said means in said detent release pin to allow said detent pin actuator to be received therein, comprises:
(a) said detent release pin having a rearward axial bore terminating at said through transverse bore;
(b) said detent release pin further having a rearward angled bore merging in communication with said rearward axial bore; and
(c) said rearward angled bore being angled away from said transverse slot in said shank, whereby said stem of said detent pin actuator is normally received in said rearward axial bore of said detent release pin, and whereby said stem of said detent pin actuator is received within said rearward angled bore in the depressed position of said detent release pin, thereby allowing said detent pin actuator to have a limited pivoted movement with respect to said detent release pin.

15. Detent coupling means as described in claim 11, wherein:
(a) said detent release pin has a pair of longitudinal surface grooves;
(b) said grooves being circumferentially opposite one another, whereby a tool may be received in each of said grooves to depress said detent actuator pin in said blind axial bore of said shank, thereby to allow said detent pin to be assembled in said detent release pin via said transverse slot in said shank.

16. Detent coupling means as described in claim 11, wherein:
(a) a spring cap is received in said blind axial bore of said shank intermediate said yieldable means and said detent pin actuator; and
(b) said spring cap having an axial bore for receiving and guiding said yieldable means.

References Cited in the file of this patent

UNITED STATES PATENTS

| | | |
|---|---|---|
| 2,954,994 | Beers | Oct. 4, 1960 |
| 2,987,334 | Wendling | June 6, 1961 |
| 3,011,794 | Vaughn | Dec. 5, 1961 |